United States Patent Office 3,640,976
Patented Feb. 8, 1972

3,640,976
CERTAIN CYCLOALKYLSULFENAMIDES AS PREVULCANIZATION INHIBITORS
Kamel Boustany, Akron, Ohio, assignor to Monsanto Company, St. Louis, Mo.
No Drawing. Filed Mar. 9, 1970, Ser. No. 17,866
Int. Cl. C08c *11/54, 11/62;* C08f *27/06*
U.S. Cl. 260—79.5 B          22 Claims

ABSTRACT OF THE DISCLOSURE

Inhibiting premature vulcanization with cycloalkyl-sulfenamides of the formula

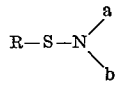

wherein $a$ and $b$ together with the nitrogen atom is piperidinyl, lower alkyl piperidinyl, aryl piperidinyl, 2,5-dilower alkyl pyrrolidinyl, hexamethyleniminyl, or

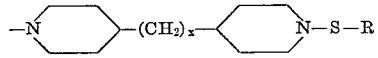

where $x$ is one, two or three, and wherein R is cycloalkyl of 5 to 12 carbon atoms.

---

This invention relates to an improved vulcanizing process for rubber and to the rubber stocks obtained by using this improved process. The invention relates to improved accelerator-inhibitor combinations for rubber. More particularly, the invention relates to a method for preventing the aging and premature vulcanization of rubber stocks and to the rubber compositions obtained by using this method.

Copending application Serial No. 518,987 of Coran, Kerwood and Trivette, filed Jan. 6, 1966, now U.S. 3,513,139, May 19, 1970, discloses a class of sulfenamide inhibitors of premature vulcanization the characteristic nucleus of which is

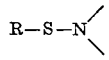

The results obtained depend peculiarly on selection of the sulfenamide inhibitor. Certain amido radicals are disclosed as suitable and R is preferably phenyl, tolyl, benzyl or primary or secondary alkyl of 3 to 12 carbon atoms. I have discovered that sulfenamides having different amide radicals are effective prevulcanization inhibitors providing that R is cycloalkyl.

SUMMARY OF THE INVENTION

The inhibitors of this invention are compounds of the formula

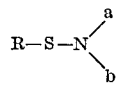

wherein $a$ and $b$ together with the nitrogen atom is N-heterocyclic amido selected from the group consisting of piperidinyl, lower alkyl piperidinyl, aryl piperidinyl, 2,5-dilower alkyl pyrrolidinyl, hexamethyleniminyl (hexahydro-1H-azepin-1-yl), or

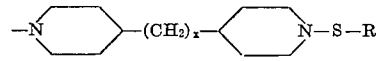

where $x$ is one, two, or three. R is cycloalkyl of 5 to 12 carbon atoms. The term lower alkyl includes primary, secondary or tertiary alkyl of 1 to 8 carbon atoms. Aryl is a monovalent radical, the free valence of which belongs to an aromatic carbocyclic nucleus and not a side chain. Aryl includes phenyl and naphthyl with phenyl the preferred group.

The efficacy of the inhibitors to inhibit premature vulcanization is surprisingly dependent upon the presence of the cycloalkyl radical. For example, the substitution of alkyl or aryl in place of cycloalkyl results in compounds with minimal inhibitor activity. Unexpectedly, when the amido position of the molecule contains the pyrrolidine ring, alkyl substitution is required for significant inhibition of prevulcanization.

The inhibitors of my invention are useful in natural and synthetic rubbers and in mixtures thereof. Synthetic rubbers that may be improved by the process of this invention include cis-4-polybutadiene, butyl rubber, ethylene-propylene terpolymer rubber, polymers of 1,3-butadiene, for example 1,3-butadiene itself and of isoprene and copolymers of 1,3-butadiene with other monomers, for example styrene, acrylonitrile, isobutylene, and methyl methacrylate. The invention relates to diene rubbers, and the terms rubber and diene rubber are synonymous for the purposes of this invention.

Rubber stocks containing delayed-action accelerators can be used in the process of this invention. The stocks are fully accelerated in the absence of the inhibitor and may contain an amine to protect the rubber from degradation. The amine usually reduces processing safety, but the new vulcanizing systems are effective to prevent premature vulcanization in the presence thereof. More scorchy accelerators can also be used with an excellent degree of improvement. The improved vulcanizing method of this invention can be used advantageously to process stocks containing furnace carbon blacks as well as stocks containing other types of blacks and fillers used in rubber compounding. The invention is also applicable to gum stocks.

Another advantage of this invention, in addition to providing greater processing safety, is that stocks containing the inhibitors actually cure faster than in their absence. The increased cure rate for rubber results in increased productivity since the stocks are in the molds for shorter periods of time.

The data infra illustrate that a combination of an accelerator and an inhibitor of this invention is an improved rubber additive which allows significantly longer and safer processing time for rubber. Further, the accelerator-inhibitor combinations of this invention improves the modulus of a vulcanizate considerably. The storage stability of a rubber mixture containing an accelerator-inhibitor combination of this invention is improved compared to a rubber mixture containing an accelerator alone.

My invention is applicable to rubber mixes containing sulfur-vulcanizing agents, organic accelerators, and antidegradants. For the purposes of this invention, sulfur-vulcanizing agent means elemental sulfur or sulfur-containing vulcanizing agent, for example, an amine disulfide, or a polymeric polysulfide. The invention is applicable to vulcanization accelerators of various classes. For example, rubber mixes containing the aromatic thiazole accelerators which include N-cyclohexyl-2-benzothiazolesulfenamide, 2-mercaptobenzothiazole, N-tert-butyl-2-benzothiazolesulfenamide, 2-benzothiazolyl diethyldithiocarbamate, N,N-diisopropyl-2-benzothiazolesulfenamide, and 2-(morpholinothio)benzothiazole can be used. Thiazole accelerators other than aromatic can be used. Stocks containing accelerators for example, dithiocarbamate accelerators, i.e. those having the NC(S)S nucleus for example, tetramethylthiuran disulfide, tetramethylthiuram monosulfide and zinc dibutyldithiocarbamate; aldehyde amine condensation products, and guanidine derivatives, are substantially improved using the method of my invention. Stocks containing mixtures of accelerators are substantially improved by using the method of my invention. Rubber mixes containing antidegradants, for example N-1,3-dimethylbutyl-N'-phenyl-p-phenylenediamine, N,N'-bis(1,4-dimethylpentyl)-p-phenylenediamine, N,N'-bis(2-octyl)-p-phenylenediamine, and other phenylenediamines, ketone, ether, and hydroxy antidegradants and mixtures thereof, are substantially improved using the process of my invention.

PREFERRED EMBODIMENTS

The inhibitors of this invention may be prepared by reacting a cycloalkylthio halide at low temperature in an inert solvent with the appropriate amine. Mueller et al., Ber. 96, 3050, 1963. They may also be prepared by reacting an N-cycloalkylthio imide with the appropriate amine as described in co-pending application of J. E. Kerwood of even date U.S. Ser. No. 17,944. Most of the compounds are liquids which may be purified by distillation. The solid compounds are purified by recrystallization. The inhibitors disperse quite easily in rubber and they may be incorporated into rubber stocks by any of the conventional means used by the rubber industry to prepare vulcanizable rubber stocks.

Examples of prevulcanization inhibitors suitable for the practice of this invention are N-cyclopentylthio piperidine,
N-cyclohexylthio-piperidine,
N-cyclooctylthio-piperidine,
N-cyclododecylthio-piperidine,
N-cyclopentylthiohexamethylenimine,
N-cyclohexylthiohexamethylenimine,
N-cyclooctylthio-hexamethylenimine,
N-cyclododecylthiohexamethylenimine,
N-cyclopentylthio-2,5-dimethyl pyrrolidine,
N-cyclohexylthio-2,5-dimethyl pyrrolidine,
N-cyclooctylthio-2,5-dimethyl pyrrolidine;

any of the N-cycloalkylthio-methyl piperidines for example

N-cyclohexylthio-4-methyl piperidine,
N-cyclooctylthio-3-methylpiperidine,
N-cyclododecylthio-2-methyl piperidine,
N-cyclohexylthio-2-methyl-5-ethyl-piperidine,
N-cyclohexylthio-2,4,6-trimethylpiperidine and
N-cyclohexylthio-2-ethylpiperidine;
N-cycloalkylthio arylpiperidine for example,
N-cyclopentylthio-4-phenylpiperidine;
N,N'-di(cycloalkylthio)-4,4'-alkylene dipiperidine
  for example N,N'-di(cyclooctylthio)-4,4'-dimethylene dipiperidine.

The following tables illustrate the invention in greater detail and the best mode for carrying it out, but are not to be construed as to narrow the scope of my invention. For the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney scorch test are desirable because this indicates greater processing safety. Percentage increases in scorch delay are calculated by dividing the Mooney scorch time of the stock containing the premature-vulcanization inhibitor by the Mooney scorch time of the control stock, multiplying by 100, and substracting 100. These increases show the percentage improvement in scorch delay over the control stock which contains no inhibitor. Additionally, cure ratings are calculated from the time required to cure the stocks at 144° C., and in some cases 153° C. All stocks are cured to achieve optimum cure which is determined from Rheometer data.

Curing characteristics are determined by means of the Monsanto Oscillating Disc Rheometer described by Decker, Wise, and Guerry in Rubber World December 1962, p. 68. From the Rheometer data, $t_2$ is the time in minutes for a rise two Rheometer units above the minimum reading and $t_{90}$ is the time required to obtain a modulus 90% of the maximum.

Table I illustrates the use of the premature vulcanization inhibitors in natural rubber. A natural rubber masterbatch is compounded as follows:

| | Parts by wt. |
|---|---|
| Smoked sheets | 100 |
| ISAF carbon black | 45 |
| Zinc oxide | 3 |
| Stearic acid | 2 |
| Hydrocarbon softener | 5 |
| Total | 155 |

Stocks are prepared by adding accelerator, antidegradant, sulfur and the prevulcanization inhibitors to the masterbatch. Prevulcanization inhibitor is excluded from the control (Stock 1). All stocks are cured at 144° C. for 40 minutes. The properties of the stocks so obtained are shown in Table I.

TABLE 1

| Stock No | 1 | 2 | 3 | 4 | 5 |
|---|---|---|---|---|---|
| Masterbatch | 155.0 | 155.0 | 155.0 | 155.0 | 155.0 |
| N-1,3-dimethylbutyl-N'-phenyl-p-phenylenediamine | 2.0 | 2.0 | 2.0 | 2.0 | 2.0 |
| N-tert-butyl-2-benzothiazolesulfenamide | 0.5 | 0.5 | 0.5 | 0.5 | 0.5 |
| Sulfur | 2.2 | 2.2 | 2.2 | 2.2 | 2.2 |
| N-cyclohexylthio piperidine | | 0.5 | | | |
| N-cyclohexylthio-2-methyl piperidine | | | 0.5 | | |
| N-cyclohexylthio-4-methyl piperidine | | | | 0.5 | |
| N-cyclohexylthio-3-methyl piperidine | | | | | 0.5 |
| Mooney scorch at 121° C.: | | | | | |
| $t_5$, minutes | 28.7 | 49.2 | 51.5 | 48.9 | 49.6 |
| Percent increase in scorch delay | | 71 | 79 | 70 | 73 |
| Rheometer at 144° C.: | | | | | |
| $t_2$ | 10.2 | 15.5 | 15.5 | 15.6 | 15.6 |
| $t_{90}-t_2$ | 15.3 | 12.5 | 13.0 | 12.4 | 12.8 |
| 300% modulus, p.s.i | 1,500 | 1,850 | 1,890 | 1,800 | 1,700 |
| Ultimate tensile strength, p.s.i | 3,850 | 4,300 | 4,200 | 4,190 | 4,200 |

Results comparable to those in the above table are obtained when the accelerator used is 2-(morpholinothio) benzothiazole. Significant increases in scorch delay and in cure rate are observed in similar tests using N-cyclohexylthio hexamethylenimine and N-cyclohexylthio-2,5-dimethyl pyrrolidine.

Table II illustrates the activity of other prevulcanization inhibitors of this invention. Stocks are prepared from the previously described natural rubber masterbatch and are cured at 144° C. until optimum cure is achieved. With each stock containing inhibitor, a control stock identical except that it contains no inhibitor is run at the same time and from the Mooney scorch times the percent increase in scorch delay is calculated in the manner previously described. The percent increase in modulus and tensile is calculated by comparing the optimum cures and the percent decrease in $t_{90}-t_2$ from the Rheometer data.

TABLE II

| Stock No | 6 | 7 | 8 |
|---|---|---|---|
| Masterbatch | 155.0 | 155.0 | 155.0 |
| N-1,3-dimethylbutyl-N'-phenyl-p-phenylenediamine | 2.0 | 2.0 | |
| N-tert-butyl-2-benzothiazolesulfenamide | 0.5 | 0.5 | 0.5 |
| Sulfur | 2.2 | 2.2 | 2.2 |
| N-cyclooctylthio piperidine | 0.5 | | |
| N-cyclododecylthio piperidine | | 0.5 | |
| N,N'-di(cyclohexylthio)-4,4'-trimethylene dipiperidine | | | 0.5 |
| Mooney scorch at 121° C., percent increase in scorch delay | 57 | 68 | 55 |
| Rheometer at 144° C., $t_{90}-t_2$, percent decrease | 16 | 18 | 9 |
| 300% modulus, p.s.i. percent increase | 24 | 15 | 3 |
| Ultimate tensile strength, p.s.i. percent increase | 11 | 13 | 2 |

A similar test with N-cyclohexylthio(4-phenyl)piperidine gives 42% increase in scorch delay.

The data of Table III, infra, illustrate the use of the prevulcanization inhibitors in synthetic rubber. Stocks are tested using an oil-extended styrene-butadiene rubber masterbatch prepared as follows:

| | Parts by wt. |
|---|---|
| SBR 1712 | 137.5 |
| ISAF furnace black | 65.0 |
| Zinc oxide | 3.0 |
| Stearic acid | 1.0 |
| Hydrocarbon softener | 1.5 |
| Total | 208.0 |

TABLE III

| Stock No | 9 | 10 | 11 |
|---|---|---|---|
| Masterbatch | 208.0 | 208.0 | 208.0 |
| Benzothiazyl disulfide | 1.2 | 1.2 | 1.2 |
| Sulfur | 2.2 | 2.2 | 2.2 |
| N-cyclohexylthiopiperidine | | 0.4 | 0.8 |
| Mooney scorch at 135° C.: | | | |
| $t_5$, minutes | 10.7 | 12.6 | 14.4 |
| Percent increase in scorch delay | | 17.8 | 34.5 |
| Rheometer at 153° C.: | | | |
| $t_2$, minutes | 5.0 | 5.6 | 6.1 |
| $t_{90}-t_2$ | 28.5 | 14.4 | 9.4 |
| Cure time, minutes | 60 | 30 | 30 |
| 300% modulus, p.s.i | 1,250 | 1,300 | 1,400 |
| Ultimate tensile strength, p.s.i | 3,660 | 3,560 | 3,600 |

The data show that in addition to increased processing safety that the prevulcanization inhibitors are also excellent cure activators. Mixtures of the inhibitors and thiazolesulfenamide accelerators exert a synergistic effect on cure rate. The cure rate of the mixture is greater than with equal amounts of either ingredient alone.

The accelerator-inhibitor combinations of this invention not only provide valuable compositions for controlling the acceleration of vulcanization but also provide compositions with improved storage stability. For example, thiazolesulfenamide accelerators lose part of their accelerating ability upon storage. However, the accelerators in combination with 0.05–50% of the stabilizers or inhibitors of this invention retain a higher proportion of their vulcanization effectiveness after storage. Usually in compositions intended for use as prevulcanization inhibitors, the inhibitor will comprise 5 to 95% of the composition by weight, and an organic vulcanization-accelerating agent will comprise 95 to 5% by weight of the composition. In general, the premature vulcanization inhibitor will comprise 0.025 to 5% of the rubber whether added alone or as a part of the mixture.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A vulcanizable composition comprising a sulfur-vulcanizable rubber, a sulfur vulcanizing agent, an accelerating agent selected from the group consisting of thiazole accelerators, dithiocarbamate accelerators, aldehyde amine accelerators and guanidine accelerators and an amount effective to inhibit premature vulcanization of a compound of the formula

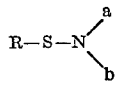

wherein $a$ and $b$ together with the nitrogen atom is piperidinyl, lower alkyl piperidinyl, aryl piperidinyl, 2,5-dilower alkyl pyrrolidinyl, hexamethyleniminyl, or

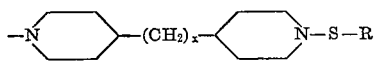

where $x$ is one, two or three and wherein R is cycloalkyl of 5 to 12 carbon atoms.

2. A composition according to claim 1 wherein

is piperidinyl.

3. A composition according to claim 1 wherein the premature vulcanization inhibitor is N-(cyclohexylthio) piperidine.

4. A composition according to claim 1 wherein the premature vulcanization inhibitor is N-(cyclohexylthio) hexamethylenimine.

5. A composition according to claim 1 wherein the premature vulcanization inhibitor is N-(cyclooctylthio) piperidine.

6. A composition according to claim 1 wherein the premature vulcanization inhibitor is N-(cyclohexylthio) methylpiperidine.

7. A composition according to claim 1 wherein the rubber is selected from the group consisting of natural rubber and styrenebutadiene rubber.

8. A vulcanizable composition comprising a vulcanizable rubber, sulfur, a thiazolesulfenamide accelerating agent selected from the group consisting of N-cyclohexyl-2-benzothiazolesulfenamide, N-tert-butyl - 2-benzothiazolesulfenamide, N,N - diisopropyl-2-benzothiazolesulfenamide, N,N-diethyl - 2 - benzothiazolesulfenamide, N,N-dicyclohexyl - 2 - benzothiazolesulfenamide, 2-(2,6-dimethylmorpholinothio)benzothiazole, and 2 - (morpholinothio)benzothiazole and an amount effective to inhibit premature vulcanization of a compound of the formula

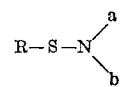

wherein $a$ and $b$ together with the nitrogen atom is piperidinyl, lower alkyl piperidinyl, aryl piperidinyl, 2,5-dilower alkyl pyrrolidinyl, hexamethyleniminyl, or

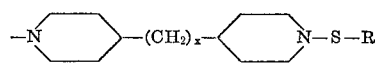

where $x$ is one, two or three and wherein R is cycloalkyl of 5 to 12 carbon atoms.

9. A composition according to claim 8 wherein

is piperidinyl.

10. A composition according to claim 8 wherein the premature vulcanization inhibitor is N-(cyclohexylthio) piperidine.

11. A composition according to claim 8 wherein the premature vulcanization inhibitor is N-(cyclohexylthio) hexamethylenimine.

12. A composition according to claim 8 wherein the premature vulcanization inhibitor is N-(cyclooctylthio) piperidine.

13. A composition according to claim 8 wherein the premature vulcanization inhibitor is N-(cyclohexylthio) methylpiperidine.

14. A composition according to claim 8 wherein the rubber is selected from the group consisting of natural rubber and styrenebutadiene rubber.

15. A composition according to claim 9 wherein the rubber is selected from the group consisting of natural rubber and styrenebutadiene rubber.

16. A composition according to claim 10 wherein the rubber is selected from the group consisting of natural rubber and styrenebutadiene rubber.

17. A composition according to claim 11 wherein the rubber is selected from the group consisting of natural rubber and styrenebutadiene rubber.

18. A composition according to claim 12 wherein the rubber is selected from the group consisting of natural rubber and styrenebutadiene rubber.

19. An accelerator-inhibitor combination comprised of an accelerating agent selected from the group consisting of thiazole accelerators, dithiocarbamate accelerators, aldehyde amine accelerators and guanidine accelerators and a premature vulcanization inhibitor in an amount effective to inhibit premature vulcanization in rubber of the formula

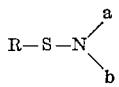

wherein $a$ and $b$ together with the nitrogen atom is piperidinyl, lower alkyl piperidinyl, aryl piperidinyl, 2,5-di-lower alkyl pyrrolidinyl, hexamethyleniminyl, or

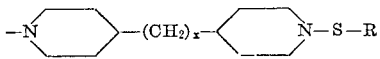

where $x$ is one, two or three and wherein R is cycloalkyl of 5 to 12 carbon atoms.

20. A combination according to claim 19 wherein

is piperidinyl.

21. A combination according to claim 19 wherein the premature vulcanization inhibitor is N-cyclohexylthio piperidine.

22. A combination according to claim 19 wherein the accelerating agent is a thiazolesulfenamide.

References Cited

UNITED STATES PATENTS 3,513,139  5/1970  Coran _____ 260—79.5

JOSEPH L. SCHOFER, Primary Examiner

C. A. HENDERSON, JR., Assistant Examiner

U.S. Cl. X.R.

252—182; 260—239 B, 293.4 R, 785, 793, 796, 797